United States Patent
Gilbreth et al.

(10) Patent No.: US 6,274,945 B1
(45) Date of Patent: Aug. 14, 2001

(54) COMBUSTION CONTROL METHOD AND SYSTEM

(75) Inventors: Mark G. Gilbreth, Woodland Hills; Simon R. Wall; Joel B. Wacknov, both of Thousand Oaks, all of CA (US)

(73) Assignee: Capstone Turbine Corporation, Chatsworth, CA (US)

( * ) Notice: Subject to any disclaimer, the term of this patent is extended or adjusted under 35 U.S.C. 154(b) by 0 days.

(21) Appl. No.: 09/459,719

(22) Filed: Dec. 13, 1999

(51) Int. Cl.$^7$ .............................. F01D 15/10; H02P 9/04
(52) U.S. Cl. .................. 290/52; 290/47; 290/48
(58) Field of Search .................... 290/47, 48, 52; 360/39.02, 39.06

(56) References Cited

U.S. PATENT DOCUMENTS

| | | | |
|---|---|---|---|
| 3,041,833 | 7/1962 | Vore | 60/39.091 |
| 3,611,717 | 10/1971 | Tissier | 60/39.091 |
| 3,805,517 | 4/1974 | Sewell et al. | 60/39.09 |
| 3,830,055 | 8/1974 | Erlund | 60/39.09 |
| 4,019,315 | 4/1977 | Yannone et al. | 60/39.03 |
| 4,033,115 | 7/1977 | Baits | 60/39.09 |
| 4,062,185 | 12/1977 | Snow | 60/204 |
| 4,062,186 | 12/1977 | Snow et al. | 60/226 R |
| 4,118,926 | 10/1978 | Curvino et al. | 60/39.06 |
| 4,414,804 | 11/1983 | Menard et al. | 60/39.161 |
| 4,597,259 | 7/1986 | Moore et al. | 60/39.091 |
| 4,897,994 | 2/1990 | Shekleton | |
| 5,442,907 | 8/1995 | Asquith et al. | 60/39.06 |
| 5,632,143 | * 5/1997 | Fisher et al. | 60/39.182 |
| 5,735,116 | 4/1998 | Mouton | 60/39.04 |
| 5,845,483 | 12/1998 | Petrowicz | 60/39.142 |
| 5,860,279 | * 1/1999 | Bronicki et al. | 60/655 |
| 5,966,926 | * 10/1999 | Shekleton et al. | 60/39.094 |
| 6,031,294 | * 2/2000 | Geis et al. | 290/52 |

* cited by examiner

*Primary Examiner*—Elvin Enad
(74) *Attorney, Agent, or Firm*—Irell & Manella, LLP; Norman Brunell; Raj Sardesai

(57) ABSTRACT

A multi-injector combustion system in which a brake resistor is utilized to provide a minimum load for the combustor system during idle or low power operation of the permanent magnet turbogenerator/motor and also to absorb power during transients to prevent flame out of the combustor. In addition, during single injector operation, a relighting method and system are provided to relight the combustor and prevent the necessity of a complete shutdown of the system. The method and system includes switching between the multiple injectors to find the most stable injector in single injector operation.

35 Claims, 5 Drawing Sheets

COMBUSTION CONTROL METHOD AND SYSTEM

TECHNICAL FIELD

This invention relates to the general field of combustion controls, and more particularly to an improved method and system for controlling and automatically relighting a turbogenerator combustor under certain conditions.

BACKGROUND OF THE INVENTION

A turbogenerator with a shaft mounted permanent magnet motor/generator can be utilized to provide electrical power for a wide range of utility, commercial and industrial applications. While an individual permanent magnet turbogenerator may only generate 20 to 100 kilowatts, powerplants of up to 500 kilowatts or greater are possible by linking numerous permanent magnet turbogenerators together. Peak load shaving power, grid parallel power, standby power, and remote location (stand-alone) power are just some of the potential applications for which these lightweight, low noise, low cost, environmentally friendly, and thermally efficient units can be useful.

The conventional power control system for a turbogenerator produces constant frequency, three phase electrical power that closely approximates the electrical power produced by utility grids. Key aspects of such a power generation system are availability and reliability.

In grid-connect power generation, lack of availability can result in penalties from the local utility. Since many utility users are charged variable rates depending upon the amount of power drawn during a given period of time, the lowest $/kWh is charged when power is drawn at lower levels than some negotiated base. Power drawn above the base level will usually have greatly increased fees and sometimes a penalty associated with it. While grid-connect power generation can be used to provide less expensive power when more than the utility base level of power is required, should this grid-connect power generation fail, or otherwise be unavailable, greater costs to the user would ensue.

Availability and reliability are even more important in a standalone system in which the turbogenerator itself is providing the entire load for a user. If the turbogenerator is unavailable, lengthy interruptions to all aspects of a user's business can occur and result in significant financial loss to the user. For remote installations, the turbogenerator could be down for a long period of time since it might take a while for a service person to provide support at the remote site.

In a gas turbine engine, inlet air is continuously compressed, mixed with fuel in an inflammable proportion, and then contacted with an ignition source to ignite the mixture which will then continue to burn. The heat energy thus released then flows in the combustion gases to a turbine where it is converted to rotary energy for driving equipment such as an electrical generator. The combustion gases are then exhausted to atmosphere after giving up some of their remaining heat to the incoming air provided from the compressor.

Quantities of air greatly in excess of stoichiometric amounts are normally compressed and utilized to keep the combustor liner cool and dilute the combustor exhaust gases so as to avoid damage to the turbine nozzle and blades. Generally, primary sections of the combustor are operated near stoichiometric conditions which produce combustor gas temperatures up to approximately four thousand (4,000) degrees Fahrenheit. Further along the combustor, secondary air is admitted which raises the air-fuel ratio and lowers the gas temperatures so that the gases exiting the combustor are in the range of two thousand (2,000) degrees Fahrenheit.

It is well established that NOx formation is thermodynamically favored at high temperatures. Since the NOx formation reaction is so highly temperature dependent, decreasing the peak combustion temperature can provide an effective means of reducing NOx emissions from gas turbine engines as can limiting the residence time of the combustion products in the combustion zone. Operating the combustion process in a very lean condition (i.e., high excess air) is one of the simplest ways of achieving lower temperatures and hence lower NOx emissions. Very lean ignition and combustion, however, inevitably result in incomplete combustion and the attendant emissions which result therefrom. In addition, combustion processes are difficult to sustain at these extremely lean operating conditions.

SUMMARY OF THE INVENTION

The invention is directed to a multi-injector combustion system in which a brake resistor is utilized to provide a minimum load for the combustor system during idle or low power operation of the permanent magnet turbogenerator/motor and also to absorb power during transients to prevent flame out of the combustor. In addition, during single injector operation, a relighting method and system are provided to relight the combustor and prevent the necessity of a complete shutdown of the system. The method and system includes switching between the multiple injectors to find the most stable injector in single injector operation.

BRIEF DESCRIPTION OF THE DRAWINGS

Figure 1:
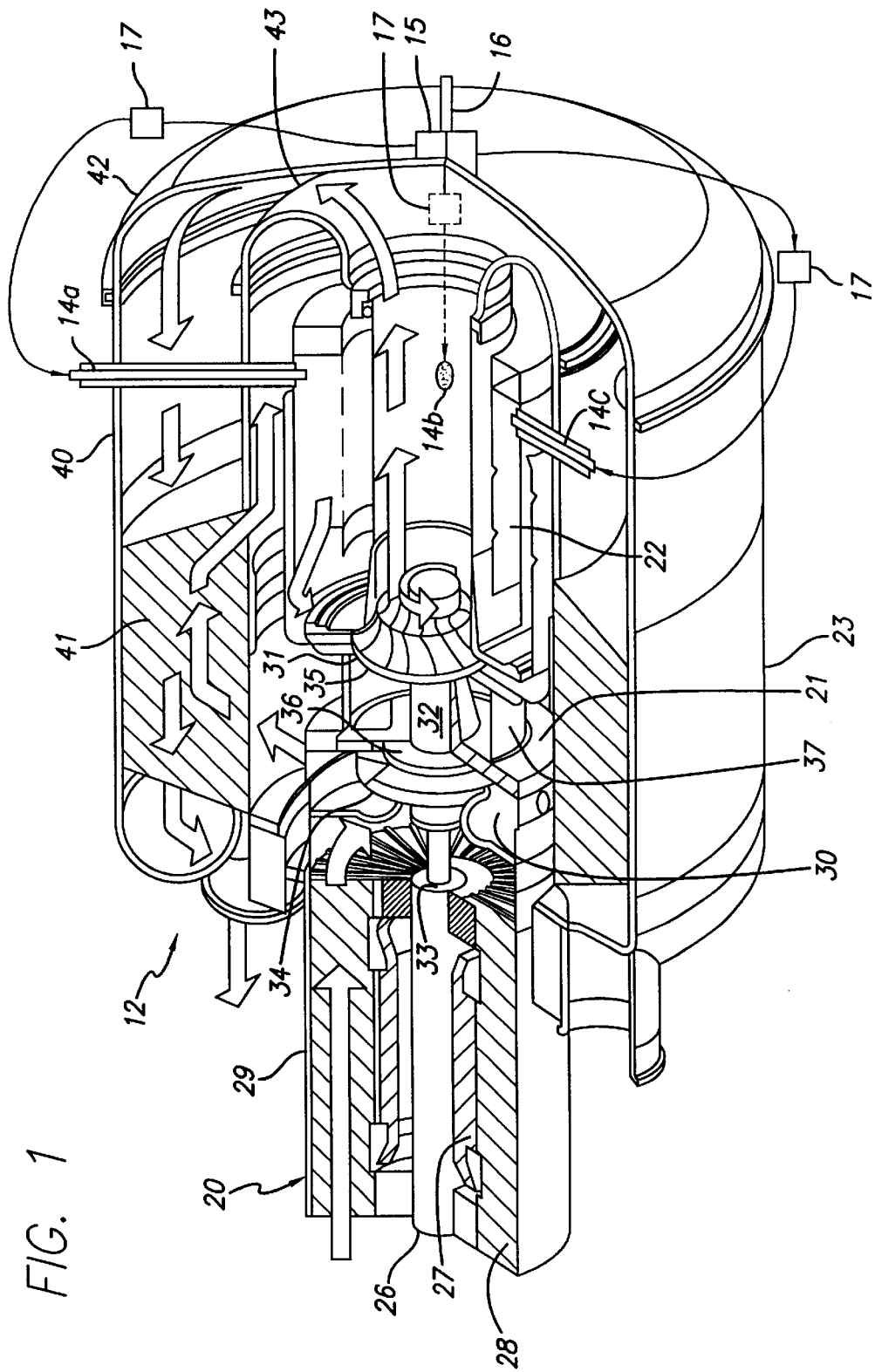
Figure 3:
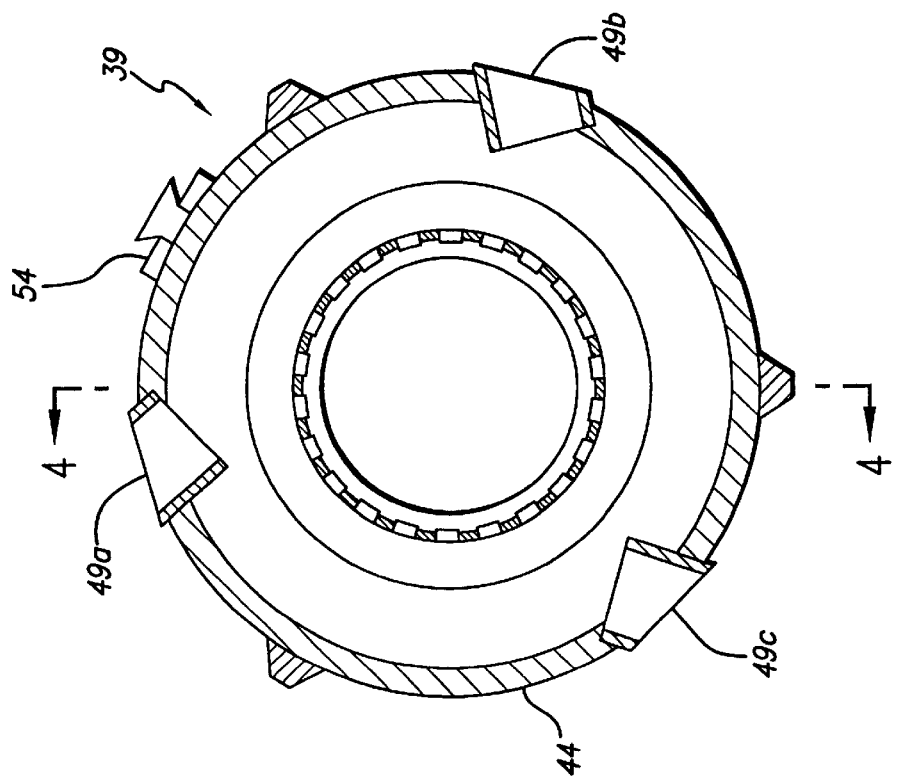
Figure 2:
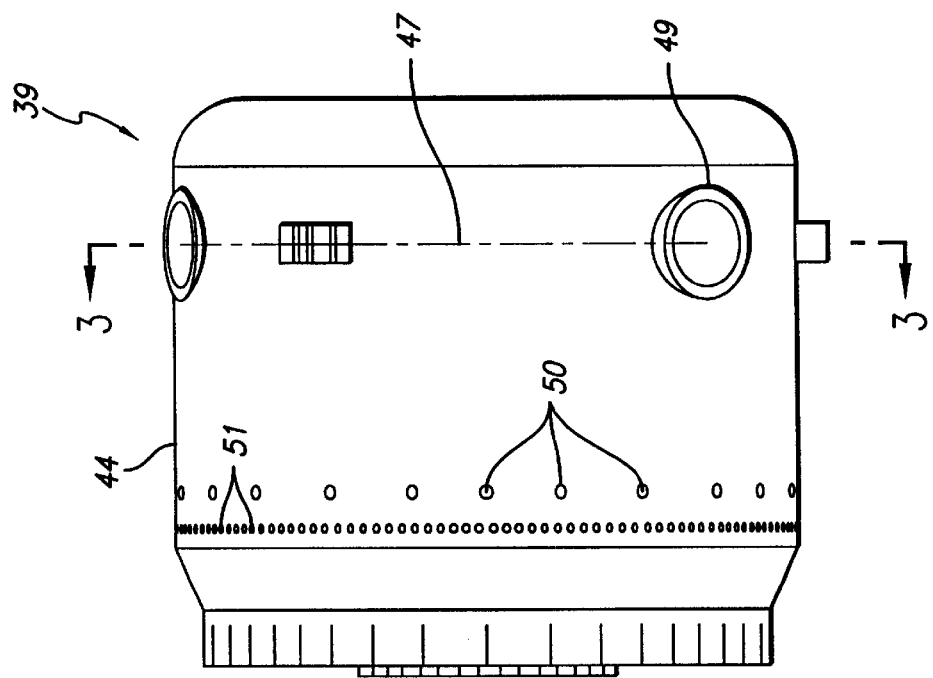
Figure 4:
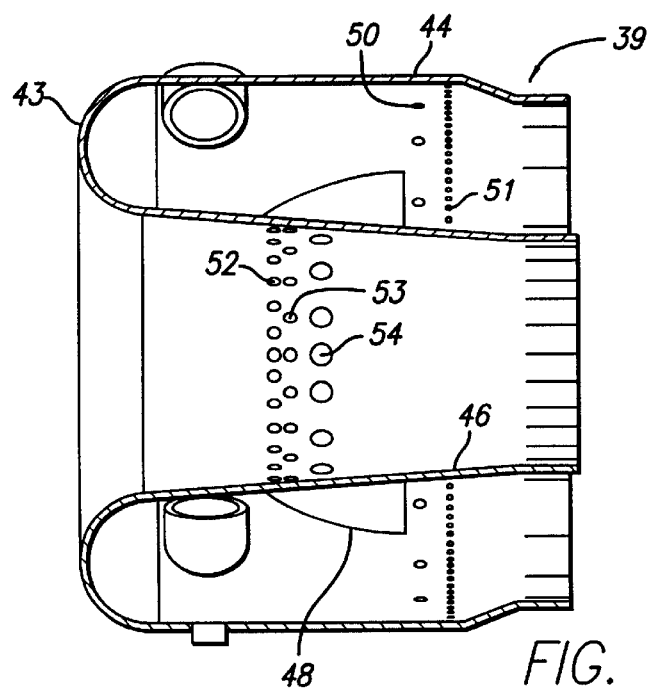
Figure 5:
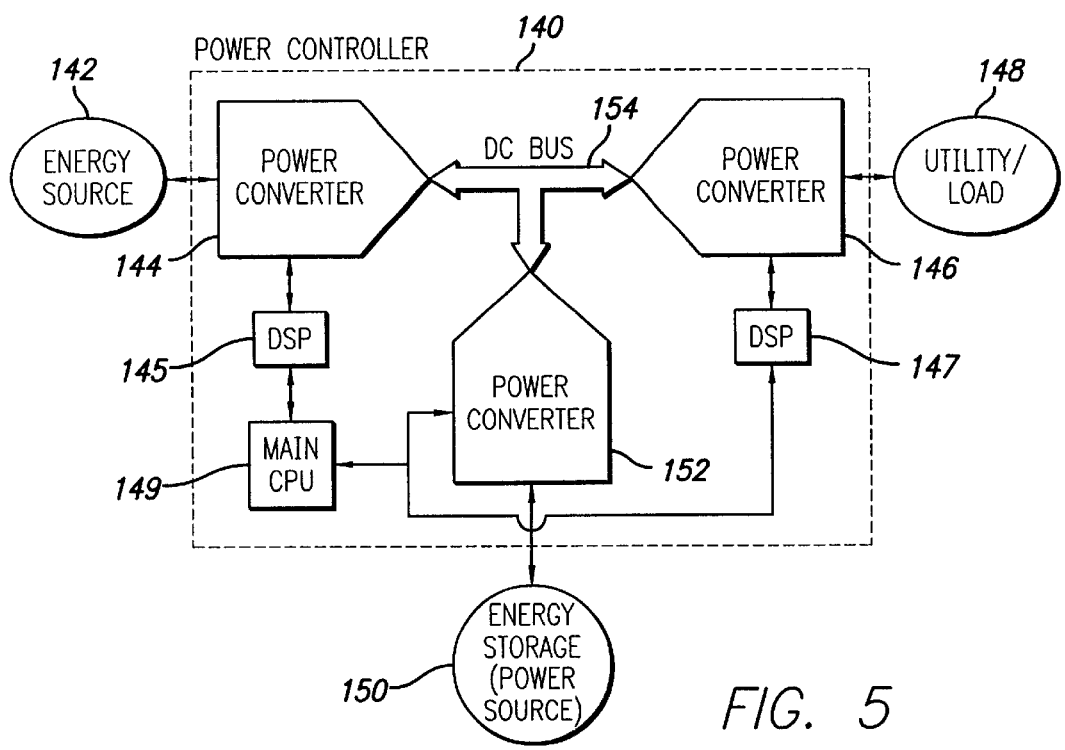
Figure 6:
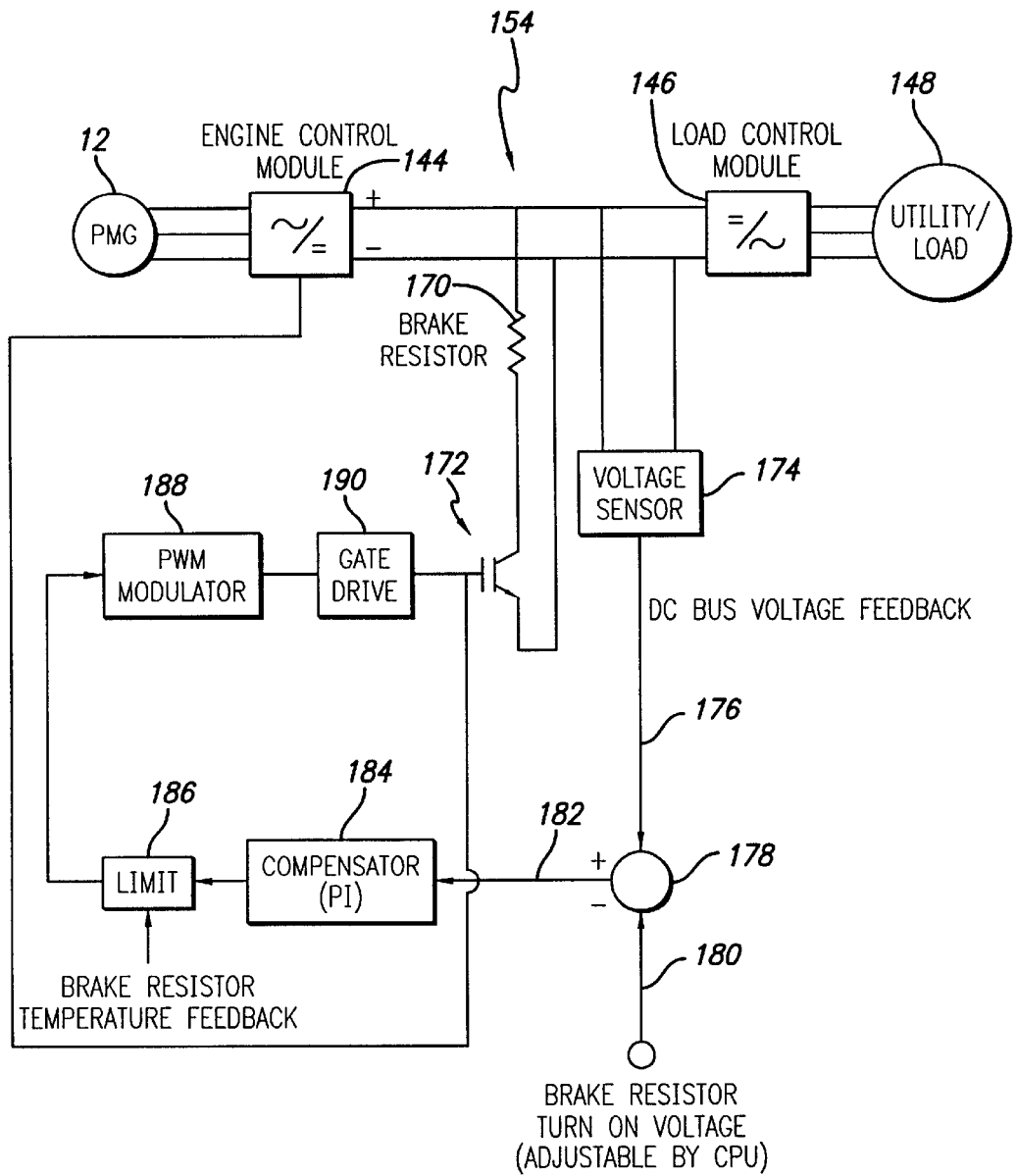
Figure 7:
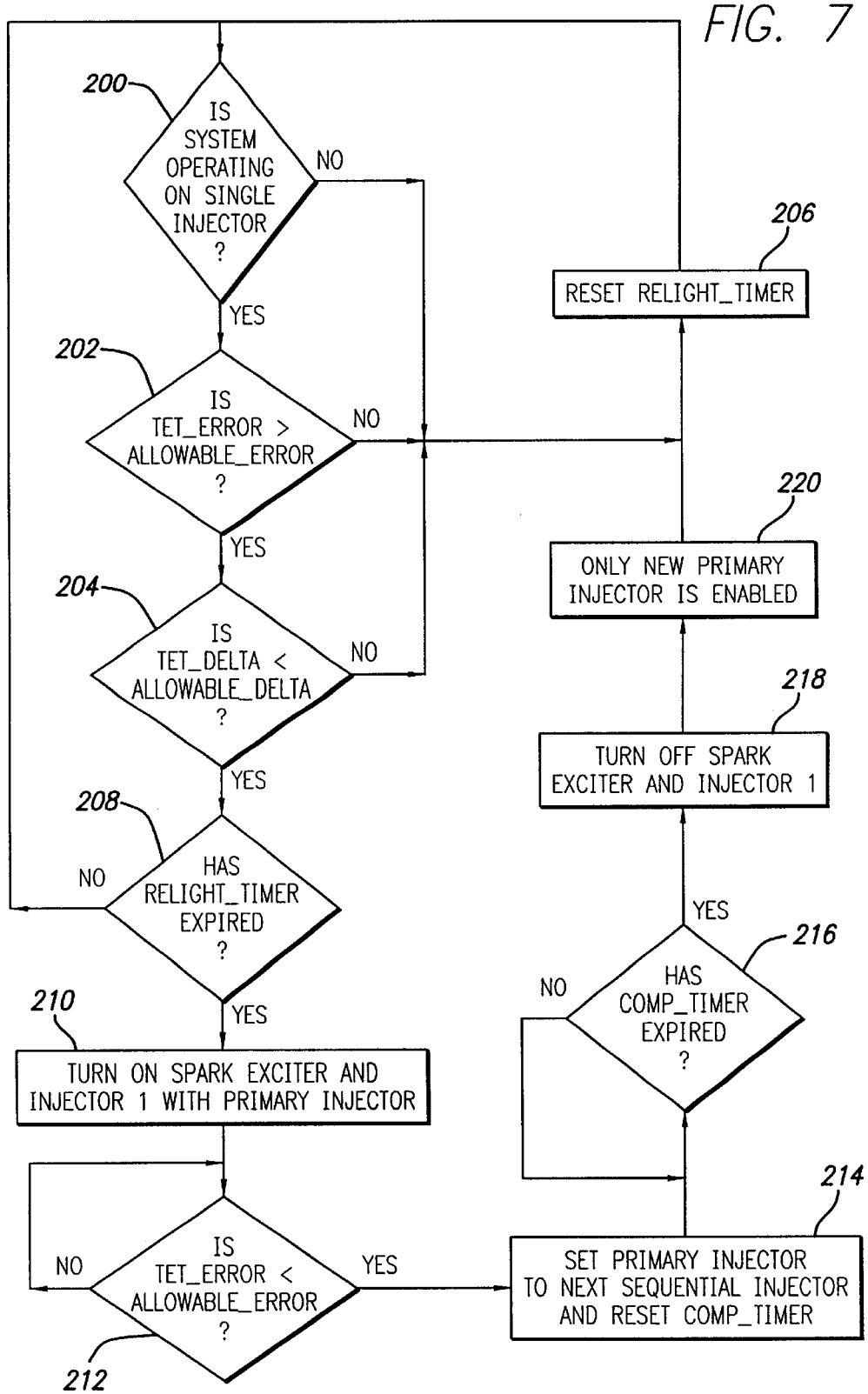

Having thus described the present invention in general terms, reference will now be made to the accompanying drawings in which:

FIG. 1 is a perspective view, partially cut away, of a turbogenerator having the combustion control method and system of the present invention;

FIG. 2 is a plan view of a combustor housing for the turbogenerator of FIG. 1;

FIG. 3 is a sectional view of the combustor housing of FIG. 2 taken along line 3—3 of FIG. 2;

FIG. 4 is a sectional view of the combustor housing of FIG. 3 taken along line 4—4 of FIG. 3;

FIG. 5 is a detailed block diagram of a power controller for use with the turbogenerator of FIG. 1;

FIG. 6 is a detailed block diagram of the power controller of FIG. 5 having a dynamic brake resistor; and FIG. 7 is an auto relight flow diagram for automatically relighting the turbogenerator combustor after a flame out.

DETAILED DESCRIPTION OF THE PREFERRED EMBODIMENTS

The turbogenerator 12 having the combustion method and system of the present invention is illustrated in FIG. 1. The turbogenerator 12 generally comprises a permanent magnet generator 20, a power head 21, a combustor 22 and a recuperator (or heat exchanger) 23.

The permanent magnet generator 20 includes a permanent magnet rotor or sleeve 26, having a permanent magnet disposed therein, rotatably supported within a permanent magnet generator stator 27 by a pair of spaced journal bearings. Radial permanent magnet stator cooling fins 28 are enclosed in an outer cylindrical sleeve 29 to form an annular air flow passage which cools the stator 27 and thereby preheats the air passing through on its way to the power head 21.

The power head 21 of the turbogenerator 12 includes compressor 30, turbine 31, and bearing rotor 32 through which the tie rod 33 to the permanent magnet rotor 26 passes. The compressor 30, having compressor impeller or wheel 34 which receives preheated air from the annular air flow passage in cylindrical sleeve 29 around the stator 27, is driven by the turbine 31 having turbine wheel 35 which receives heated exhaust gases from the combustor 22 supplied with preheated air from recuperator 23. The compressor wheel 34 and turbine wheel 35 are supported on a bearing shaft or rotor 32 having a radially extending bearing rotor thrust disk 36. The bearing rotor 32 is rotatably supported by a single journal bearing within the center bearing housing 37 while the bearing rotor thrust disk 36 at the compressor end of the bearing rotor 32 is rotatably supported by a bilateral thrust bearing.

Intake air is drawn through the permanent magnet generator 20 by the compressor 30 which increases the pressure of the air and forces it into the recuperator 23. The recuperator 23 includes an annular housing 40 having a heat transfer section 41, an exhaust gas dome 42 and a combustor dome 43. Exhaust heat from the turbine 31 is used to preheat the air before it enters the combustor 22 where the preheated air is mixed with fuel and burned. The combustion gases are then expanded in the turbine 31 which drives the compressor 30 and the permanent magnet rotor 26 of the permanent magnet generator 20 which is mounted on the same shaft as the turbine 31. The expanded turbine exhaust gases are then passed through the recuperator 23 before being discharged from the turbogenerator 12.

The combustor housing 39 of the combustor 22 is illustrated in FIGS. 2–4, and generally comprises a cylindrical outer liner 44 and a tapered inner liner 46 which, together with the combustor dome 43, form a generally expanding annular combustion housing or chamber 39 from the combustor dome 43 to the turbine 31. A plurality of fuel injector guides 49a, 49b, and 49c may position the fuel injectors 14a, 14b, and 14c, respectively, to tangentially introduce a fuel/air mixture at the combustor dome 43 end of the annular combustion housing 39 along the fuel injector axis or centerline 47. This same centerline 47 includes an ignitor cap to position an ignitor (not shown) within the combustor housing 39. The combustion dome 43 is rounded out to permit the swirl pattern from the fuel injectors 14a, 14b, and 14c to fully develop and also to reduce structural stress loads in the combustor.

A flow control baffle 48 extends from the tapered inner liner 46 into the annular combustion housing 39. The baffle 48, which would be generally skirt-shaped, would extend between one-third and one-half of the distance between the tapered inner liner 46 and the cylindrical outer liner 44. Three rows each of a plurality of spaced offset air dilution holes 52, 53, and 54 in the tapered inner liner 46 underneath the flow control baffle 48 introduce dilution air into the annular combustion housing 39. The first two (2) rows of air dilution holes 52 and 53 (closest to the fuel injector centerline 47) may be the same size with both, however, smaller than the third row of air dilution holes 54.

In addition, two (2) rows each of a plurality of spaced air dilution holes 50 and 51 in the cylindrical outer liner 44, introduce more dilution air downstream from the flow control baffle 48. The plurality of holes 50 closest to the flow control baffle 48 may be larger and less numerous than the second row of holes 51.

Fuel can be provided individually to each fuel injector 14a, 14b, and 14c, or, as shown in FIG. 1, a fuel manifold 15 can be used to supply fuel to all three (3) fuel injectors. The fuel manifold 15 includes a fuel inlet 16 to receive fuel from a fuel source (not shown). Flow control valves 17 are provided in each of the fuel lines from the manifold 15 to the individual fuel injectors 14a, 14b, and 14c. In order to sustain low power operation, maintain fuel economy and low emissions, the flow control valves 17 can be individually controlled to an on/off position (to separately use any combination of fuel injectors individually) or they can be modulated together. The flow control valves 17 can be opened by fuel pressure or their operation can be controlled or augmented with a solenoid.

A more detailed description of the combustor and fuel injectors can be found in U.S. Pat. No. 5,850,732, issued Dec. 22, 1998 to Jeffrey W. Willis et al, entitled "Low Emissions Combustion System", assigned to the same assignee as this application and hereby incorporated by reference.

The system has a steady-state turbine exhaust temperature limit, and the turbogenerator operates at this limit at most speed conditions to maximize system efficiency. This turbine exhaust temperature limit is decreased at low ambient temperatures to prevent engine surge.

Referring to FIG. 5, there is illustrated a power controller 140 for use with the turbogenerator of FIG. 1. This power controller 140, which may be digital, provides a distributed generation power networking system in which bi-directional (i.e. reconfigurable) power converters are used with a common DC bus 154 for permitting compatibility between one or more energy components. Each power converter 144 and 146 operates essentially as a customized bi-directional switching converter configured, under the control of power controller 140, to provide an interface for a specific energy component to DC bus 154. Power controller 140 controls the way in which each energy component, at any moment, will sink or source power, and the manner in which DC bus 154 is regulated. In this way, various energy components can be used to supply, store and/or use power in an efficient manner.

The energy components include an energy source 142 such as the turbogenerator 12, utility/load 148, and storage device 150 such as a battery. The energy source 142 is connected to DC bus 154 via power converter 144 under the control of signal processor 145. Energy source 142 may produce AC that is applied to power converter 146 under control of signal processor 147. DC bus 154 connects power converter 144 to utility/load 148 and additional energy components. Main CPU 149 provides supervisory operation of power controller 140, specifically signal processors 145 and 147.

Each power converter 144, 146, and 152 operates essentially as a customized, bi-directional switching converter under the control of main CPU 149, which uses signal processors 145 and 147 to perform its operations. Main CPU 149 provides both local control and sufficient intelligence to form a distributed processing system. Each power converter 144, 146, and 152 is tailored to provide an interface for a specific energy component to DC bus 154. Main CPU 149 controls the way in which each energy component 142, 148, and 150 sinks or sources power and DC bus 154 is regulated at any time. In particular, main CPU 149 reconfigures the power converters 144, 146, and 152 into different configurations for different modes of operation. In this way, various energy components 142, 148, and 150 can be used to supply, store and/or use power in an efficient manner.

In the case of a turbogenerator 12 as the energy source 142, a conventional system regulates turbine speed to control the output or bus voltage. In the power controller 140, the bi-directional controller functions independently of turbine speed to regulate the bus voltage.

FIG. 5 generally illustrates the system topography with the DC bus 154 at the center of a star pattern network. In general, energy source 12 provides power to DC bus via power converter 144 during normal power generation mode. Similarly, during power generation, power converter 146 converts the power on DC bus 154 to the form required by utility/load 148. During utility start up, power converters 144 and 146 are controlled by the main processor to operate in different manners. For example, if energy is needed to start the turbogenerator 12, this energy may come from load/utility 148 (utility start) or from energy source 150 (battery start). During a utility start up, power converter 146 is required to apply power from load 148 to DC bus for conversion by power converter 144 into the power required by the turbogenerator 12 to start up. During utility start, the turbogenerator 12 is controlled in a local feedback loop to maintain the turbine revolutions per minute (RPM). Energy storage or battery 150 is disconnected from DC bus while load/utility grid regulates VDC on DC bus 154.

Similarly, in a battery start, the power applied to DC bus 154 from which turbogenerator 12 may be started, may be provided by energy storage 150. Energy storage 150 has its own power conversion circuit in power converter 152, which limits the surge current into the DC bus 154 capacitors, and allows enough power to flow to DC bus 154 to start turbogenerator 12.

A more detailed description of the power controller can be found in U.S. patent application Ser. No. 207,817, filed Dec. 8, 1998 by Mark G. Gilbreth et al, entitled "Power Controller", assigned to the same assignee as this application and hereby incorporated by reference.

FIG. 6 illustrates a power controller of FIG. 5 having a dynamic brake resistor and associated controls. The turbogenerator 12 produces three phase AC power which is fed to AC to DC converter 144, referred to here as the engine control module. The DC voltage is supplied to DC bus 154 which is connected to DC to AC converter 126, referred to here as the load control module, which is connected to the load 148, such as the utility grid.

A brake resistor 170 is connected across the DC bus 154. Power in the DC bus can be dissipated in brake resistor 170 by modulation of switch 172. A voltage sensor 174 is also connected across the DC bus 154 to produce a DC bus voltage signal 176 which is compared in comparator 178 with a brake resistor turn on voltage signal 180 to produce a DC bus error signal 182. The brake resistor turn on voltage signal 180 is adjustable by CPU 149.

The DC bus error signal 182 from comparator 178 is used to control the modulation of switch 172 after being conditioning through a proportional integral compensator 184, a brake resistor temperature feedback limit 186, a pulse width modulator 188 and gate drive 190. The switch 172 may be an IGBT switch although conventional or newly developed switches can be utilized as well. The switch 172 is controlled in accordance with the magnitude of the voltage on DC bus 154. Signal processor 147 typically maintains the DC bus voltage to a selected value by appropriate control of power flows in the load control module 146 and the engine control module 144. If a rise in voltage on the DC bus is detected, the brake resistor 170 is modulated on and off until the bus voltage is restored to its desired level.

As outlined above, the turbogenerator combustion system is a low emission system coupled with a recuperator creating an efficient gas turbine in the turbogenerator. In order to achieve low emissions, the fuel source is diluted into a large volume of air. Little fuel is required at idle speeds because the recuperator is capable of supplying most of the energy required to self-sustain gas turbine operation. A high air-to-fuel ratio (AFR) mixture is created with large amounts of air flow and low fuel flow, thus reducing the stability of the combustion. Flame out conditions occur (combustion ceases) when the AFR reaches too high a level. Of course, flame out can result in a time consuming shutdown and restart cycle.

In a multi-injector combustion system, the first line of defense for preventing flame out is to operate on fewer injectors. When low levels of fuel flow are detected, the delivery of fuel to some injectors are turned off. By turning off injectors, fuel flow can be concentrated into fewer injectors to reduce AFR and increase combustion stability. At very low power levels, even operating on a single injector may not provide low enough AFR levels to prevent flame out conditions.

The brake resistor 170 can be extremely helpful in maintaining combustion flame stability. For example, during an off load event, the power flowing into the utility/load 148 is suddenly reduced, and if the power produced by the gas turbine engine is reduced at the same rate, the fuel flow can be reduced too rapidly to maintain combustion and flame out can occur. With the brake resistor able to absorb excess energy that is produced by the gas turbine engine but not supplied to the utility/load 148, the fuel flow to the combustor can be reduced more gradually at a rate that can be sustained by the combustion system. In other words, the fuel flow can be reduced at a rate that considers the maintaining of combustion rather than just rapidly reducing fuel flow to compensate for the off load event. The brake resistor 170, by absorbing excess energy, permits a slower deceleration since any load not transferred out of the power converter 146 can be absorbed by the brake resistor 170.

In addition, the brake resistor 170 can provide a minimum load during idle or no load operating conditions. With the external load disconnected, the combustion system might not otherwise be able to maintain combustion without this minimum load supplied by the brake resistor 170.

While flame out conditions are certainly not desired, the high AFR mixture provides a unique opportunity to relight the gas turbine combustor without shutting the gas turbine down. Typically gas turbines systems require controls to shutdown the turbine, bring speed down to zero rpm, and then issue a restart command in order to regain operation after a flame out condition occurs. With a high AFR mixture, the gas turbine is often below its ideal AFR for light off. By turning on the ignition system and allowing the temperature control to add more fuel, an ideal AFR will be found that will reignite combustion in the gas turbine. Significant interruption can be avoided by reigniting the gas turbine engine without having to perform a complete shutdown.

Without combustion power it is difficult to keep a gas turbine rotating without some external power source. The power controller 140 can provide added help to the relight process by supplying power from a power source 148 or 150 to keep the gas turbine rotating when a flameout has occurred. Someone skilled in the art should understand that any type of starter motor configuration would provide the same capability.

A flow diagram for the automatic relight process is illustrated in FIG. 7. The logic first determines if the combustion system is operating on a single injector, block 200. Single injector operation is an indication of low fuel flow being delivered to the combustor and a potential for flame out exists. If the combustor is operating on a single injector, block 200, block 202 determines whether the turbine exhaust temperature (TET) error is greater than an allowable error which is a function of gas turbine speed. The TET error is the difference between the ideal operation temperature (set point) and the TET feedback (actual TET). If the TET error is greater than an allowable error, block 202, block 204 determines if the TET delta is less than an allowable delta, which is also a function of gas turbine speed. The TET delta is the rate of change of TET. If the system is not operating on a single injector, block 200, or the TET error is not greater than the allowable error, block 202, or the TET delta is not less than the allowable delta, block 204, the relight timer is reset in block 206 and operation continues on the same primary injector.

The relight process begins when flame out detection described in blocks 200, 202, and 204 exists for a time period that allows the relight timer of block 208 to expire. At this time, the spark exciter or ignitor is turned on and the injector (injector 14a also referred to in FIG. 7 as injector 1) flowing fuel directly in the ignition system path is enabled together with the primary injector that the gas turbine is currently using to deliver fuel, block 210. Evaluating block 212 to determine if the TET error is less than allowable error indicates whether relight of the gas turbine has occurred. Once relight is detected, block 212, the primary injector is switched from the current injector to it adjacent injector, block 214, and the completion timer is reset. The completion timer provides a period for combustion and TET to stabilize after gas turbine relight. If the completion timer has expired, block 216, the spark exciter and initial injector are turned off, block 218 with only the new primary injector enabled, block 220, followed by a resetting of the relight timer, block 206.

Successive iterations through the relight logic of FIG. 7 will rotate the primary injector until the most stable injector is found. In this system of three injectors 14a, 14b and 14c, assume that the injector flowing fuel directly in the ignition system path is injector 14a. When the system initially lights assume that injector 14b is assigned as the primary injector as discussed above. When the relight logic commences the spark exciter and injector 14a will be enabled with the primary injector (now injector 14b). Once relight of the gas turbine is detected the primary injector designation is reassigned to injector 14c. At this time injector 14b is shutoff and injector 14c is enabled. Fuel flowing from injector 14c will ignite via the combustion process occurring at injector 14a. Once the completion timer expires, spark exciter and injector 14a are disabled leaving only the primary injector (injector 14c) operating to maintain combustion. Stepping through the relight logic on the next iteration would transfer operation from injector 14c to injector 14a. Eventually one injector is found to be more stable than the other injectors are and the system continues operating with this injector as the primary injector.

The system is declared unrecoverable and a shutdown occurs when the relight process of blocks 210, 212 is unsuccessful and the flame out condition exists for a lengthy period of time. The relight logic has only a window of time during this detection period to recover prior to declaring an unrecoverable fault.

A key point in the logic is the switching of injectors. The combustion system described illustrates three injectors by way of example. In such a three injector system, if two injectors were found to be less stable than the third injector, the system would execute the relight logic until the stable injector was found. At this time, the conditions of block 202 and 204 will not exist and the auto relight and injector switching logic will not be executed While specific embodiments of the invention have been illustrated and described, it is to be understood that these are provided by way of example only and that the invention is not to be construed as being limited thereto but only by the proper scope of the following claims.

What we claim is:

1. A method of relighting a multi injector combustor in a turbogenerator, the method comprising:
    a. determining that the combustor is operating on a single injector considered the primary injector;
    b. determining that combustion has ceased;
    c. turning on the ignitor;
    d. determining that the combustor has been relit;
    e. switching the primary injector to the next sequential injector:
    f. turning off the spark exciter; and
    g. continuing operation with the new primary injector.

2. A method of relighting a multi injector combustor in a turbogenerator, the method comprising:
    a. determining that the combustor is operating on a single injector considered the primary injector;
    b. determining that combustion has ceased;
    c. turning on the ignitor;
    d. determining that the combustor has been relit;
    e. switching the primary injector to the next sequential injector:
    f. turning off the spark exciter;
    g. determining that relight has occurred; and
    h. continuing operation with the new primary injector.

3. A method of relighting a multi injector combustor in a turbogenerator, the method comprising:
    a. determining that the combustor is operating on a single injector considered the primary injector;
    b. determining that combustion has ceased;
    c. turning on the ignitor;
    d. determining that the combustor has been relit;
    e. switching the primary injector to the next sequential injector:
    f. turning off the spark exciter;
    g. determining that relight has not occurred;
    h. repeating steps (a) through (f) until it is determined that relight has occurred with a stable primary injector; and
    i. continuing operation with the new primary injector.

4. A method of relighting a multi injector combustor in a turbogenerator, the method comprising:
    a. determining that the combustor is operating on a single injector considered the primary injector;
    b. determining that combustion has ceased;
    c. determining that the relight timer has expired;
    d. turning on the spark exciter;
    e. turning on the fuel injector delivering fuel to the spark exciter area of the combustor;
    f. turning on fuel delivery to the then primary fuel injector if the then primary injector is not the injector delivering fuel to the spark exciter area of the combustor;
    g. determining that the combustor has been relit;

h. switching the primary injector to the next sequential injector:
i. turning off the spark exciter;
j. turning off the fuel injector delivering fuel to the spark exciter area of the combustor if that injector is not the new primary injector;
k. resetting the relight timer;
l. determining that relight has occurred; and
m. resetting the relight timer and continuing operation with the new primary injector.

5. A method of relighting a multi injector combustor in a turbogenerator, the method comprising:
a. determining that the combustor is operating on a single injector considered the primary injector;
b. determining that combustion has ceased;
c. determining that the relight timer has expired;
d. turning on the spark exciter;
e. turning on the fuel injector delivering fuel to the spark exciter area of the combustor;
f. turning on fuel delivery to the then primary fuel injector if the then primary injector is not the injector delivering fuel to the spark exciter area of the combustor;
g. determining that the combustor has been relit;
h. switching the primary injector to the next sequential injector:
i. turning off the spark exciter;
j. turning off the fuel injector delivering fuel to the spark exciter area of the combustor if that injector is not the new primary injector;
k. resetting the relight timer;
l. determining that relight has not occurred;
m. resetting the relight timer;
n. repeating steps (a) through (k) until it is determined that relight has occurred with a stable primary injector; and
o. resetting the relight timer and continuing operation with the new primary injector.

6. A method of relighting a multi injector combustor in a turbogenerator, the method comprising:
a. determining that the combustor is operating on a single injector considered the primary injector;
b. determining that the turbine exhaust temperature error is greater than an allowable error;
c. determining that the turbine exhaust temperature delta is less than an allowable delta;
d. determining that the relight timer has expired;
e. turning on the spark exciter;
f. turning on the fuel injector delivering fuel to the spark exciter area of the combustor;
g. turning on fuel delivery to the then primary fuel injector if the then primary injector is not the injector delivering fuel to the spark exciter area of the combustor;
h. determining that the turbine exhaust temperature error is less than an allowable error;
i. switching the primary injector to the next sequential injector, delivering fuel to the new primary injector and ceasing to deliver fuel to the initial primary injector;
j. resetting the completion timer;
k. determining that the completion timer has expired;
l. turning off the spark exciter;
m. turning off the fuel injector delivering fuel to the spark exciter area of the combustor if that injector is not the new primary injector leaving the new primary injector as the only fuel injector delivering fuel to the combustor;
n. resetting the relight timer;
o. determining that the turbine exhaust temperature error is less than an allowable error; and
p. resetting the relight timer and continuing operation with the new primary injector.

7. A method of relighting a multi injector combustor in a turbogenerator, the method comprising:
a. determining that the combustor is operating on a single injector considered the primary injector;
b. determining that the turbine exhaust temperature error is greater than an allowable error;
c. determining that the turbine exhaust temperature delta is less than an allowable delta;
d. determining that the relight timer has expired;
e. turning on the spark exciter;
f. turning on the fuel injector delivering fuel to the spark exciter area of the combustor;
g. turning on fuel delivery to the then primary fuel injector if the then primary injector is not the injector delivering fuel to the spark exciter area of the combustor;
h. determining that the turbine exhaust temperature error is less than an allowable error;
i. switching the primary injector to the next sequential injector, delivering fuel to the new primary injector and ceasing to deliver fuel to the initial primary injector;
j. resetting the completion timer;
k. determining that the completion timer has expired;
l. turning off the spark exciter;
m. turning off the fuel injector delivering fuel to the spark exciter area of the combustor if that injector is not the new primary injector leaving the new primary injector as the only fuel injector delivering fuel to the combustor;
n. resetting the relight timer;
o. determining that the turbine exhaust temperature error is less than an allowable error and that the turbine exhaust temperature delta is greater than an allowable delta; and
p. resetting the relight timer and continuing operation with the new primary injector.

8. A method of relighting a multi injector combustor in a turbogenerator, the method comprising:
a. determining that the combustor is operating on a single injector considered the primary injector;
b. determining that the turbine exhaust temperature error is greater than an allowable error;
c. determining that the turbine exhaust temperature delta is less than an allowable delta;
d. determining that the relight timer has expired;
e. turning on the spark exciter;
f. turning on the fuel injector delivering fuel to the spark exciter area of the combustor;
g. turning on fuel delivery to the then primary fuel injector if the then primary injector is not the injector delivering fuel to the spark exciter area of the combustor;
h. determining that the turbine exhaust temperature error is less than an allowable error;
i. switching the primary injector to the next sequential injector, delivering fuel to the new primary injector and ceasing to deliver fuel to the initial primary injector;

j. resetting the completion timer;

k. determining that the completion timer has expired;

l. turning off the spark exciter;

m. turning off the fuel injector delivering fuel to the spark exciter area of the combustor if that injector is not the new primary injector leaving the new primary injector as the only fuel injector delivering fuel to the combustor;

n. resetting the relight timer;

o. determining that the turbine exhaust temperature error is more than an allowable error;

p. resetting the relight timer;

q. repeating steps (a) through (n) until it is determined that relight has occurred with a stable primary injector; and r. resetting the relight timer and continuing operation with the new primary injector.

9. A method of relighting a turbogenerator having an annular combustor with three equally spaced tangential fuel injectors, the method comprising:

a. determining that the combustor is operating on a single fuel injector considered the primary injector;

b. determining that combustion has ceased;

c. turning on the ignitor;

d. determining that the combustor has been relit;

e. switching the primary injector from the primary fuel injector to the next sequential fuel injector;

f. turning off the spark ignitor;

g. determining that relight has occurred; and h. continuing operation with the new primary injector.

10. A method of relighting a turbogenerator having an annular combustor with three equally spaced tangential fuel injectors, the method comprising:

a. determining that the combustor is operating on a single fuel injector considered the primary injector and that the primary injector is the first fuel injector which delivers fuel to the spark exciter area of the combustor;

b. determining that the turbine exhaust temperature error is greater than an allowable error;

c. determining that the turbine exhaust temperature delta is less than an allowable delta;

d. determining that the relight timer has expired;

e. turning on the spark exciter;

f. turning on the first fuel injector delivering fuel to the spark exciter area of the combustor;

g. determining that the turbine exhaust temperature error is less than an allowable error;

h. switching the primary injector from the first fuel injector to the second fuel injector and delivering fuel to the second fuel injector;

i. resetting the completion timer;

j. determining that the completion timer has expired;

k. turning off the spark exciter;

l. turning off the first fuel injector delivering fuel to the spark exciter area of the combustor;

m. resetting the relight timer;

n. determining that the turbine exhaust temperature error is less than an allowable error; and o. resetting the relight timer and continuing operation with the second injector.

11. A method of relighting a turbogenerator having an annular combustor with three equally spaced tangential fuel injectors, the method comprising:

a. determining that the combustor is operating on a single fuel injector considered the primary injector and that the primary injector is the first fuel injector which delivers fuel to the spark exciter area of the combustor;

b. determining that the turbine exhaust temperature error is greater than an allowable error;

c. determining that the turbine exhaust temperature delta is less than an allowable delta;

d. determining that the relight timer has expired;

e. turning on the spark exciter;

f. turning on the first fuel injector delivering fuel to the spark exciter area of the combustor;

g. determining that the turbine exhaust temperature error is less than an allowable error;

h. switching the primary injector from the first fuel injector to the second fuel injector as the primary fuel injector and delivering fuel to the second fuel injector;

i. resetting the completion timer;

j. determining that the completion timer has expired;

k. turning off the spark exciter;

l. turning off the first fuel injector delivering fuel to the spark exciter area of the combustor;

m. resetting the relight timer;

n. determining that the turbine exhaust temperature error is more than an allowable error;

o. determining that the relight timer has expired;

p. turning on the spark exciter;

q. turning on the first fuel injector delivering fuel to the spark exciter area of the combustor;

r. turning on the second fuel injector and delivering fuel to the second fuel injector;

s. determining that the turbine exhaust temperature error is less than an allowable error;

t. switching the primary injector from the second fuel injector to the third fuel injector, delivering fuel to the third fuel injector and ceasing to deliver fuel to the second fuel injector;

u. resetting the completion timer;

v. determining that the completion timer has expired;

w. turning off the spark exciter;

x. turning off the first fuel injector delivering fuel to the spark exciter area of the combustor;

y. resetting the relight timer;

z. determining that the turbine exhaust temperature error is less than an allowable error; and aa. resetting the relight timer and continuing operation with the third injector.

12. A method of relighting a turbogenerator having an annular combustor with three equally spaced tangential fuel injectors, the method comprising:

a. determining that the combustor is operating on a single fuel injector considered the primary injector and that the primary injector is the second fuel injector which does not deliver fuel to the spark exciter area of the combustor;

b. determining that the turbine exhaust temperature error is greater than an allowable error;

c. determining that the turbine exhaust temperature delta is less than an allowable delta;

d. determining that the relight timer has expired;

e. turning on the spark exciter;

f. turning on the first fuel injector delivering fuel to the spark exciter area of the combustor;

g. turning on the second fuel injector and delivering fuel to the second fuel injector;

h. determining that the turbine exhaust temperature error is less than an allowable error;

i. switching the primary injector from the second fuel injector to the third fuel injector, delivering fuel to the third fuel injector and ceasing to deliver fuel to the second fuel injector;

j. resetting the completion timer;

k. determining that the completion timer has expired;

l. turning off the spark exciter;

m. turning off the first fuel injector delivering fuel to the spark exciter area of the combustor;

n. resetting the relight timer;

o. determining that the turbine exhaust temperature error is less than an allowable error; and p. resetting the relight timer and continuing operation with the third injector.

13. A method of relighting a turbogenerator having an annular combustor with three equally spaced tangential fuel injectors, the method comprising:

a. determining that the combustor is operating on a single fuel injector considered the primary injector and that the primary injector is the second fuel injector which does not deliver fuel to the spark exciter area of the combustor;

b. determining that the turbine exhaust temperature error is greater than an allowable error;

c. determining that the turbine exhaust temperature delta is less than an allowable delta;

d. determining that the relight timer has expired;

e. turning on the spark exciter;

f. turning on the first fuel injector delivering fuel to the spark exciter area of the combustor;

g. turning on the second fuel injector and delivering fuel to the second fuel injector;

h. determining that the turbine exhaust temperature error is less than an allowable error;

i. switching the primary fuel injector from the second fuel injector to the third fuel injector, delivering fuel to the third fuel injector and ceasing to deliver fuel to the second fuel injector;

j. resetting the completion timer;

k. determining that the completion timer has expired;

l. turning off the spark exciter;

m. turning off the first fuel injector delivering fuel to the spark exciter area of the combustor;

n. resetting the relight timer;

o. determining that the turbine exhaust temperature error is more than an allowable error;

p. determining that the relight timer has expired;

q. turning on the spark exciter;

r. turning on the first fuel injector delivering fuel to the spark exciter area of the combustor;

s. turning on the third fuel injector and delivering fuel to the third fuel injector;

t. determining that the turbine exhaust temperature error is less than an allowable error;

u. switching the primary injector from the third fuel injector to the first fuel injector as the primary fuel injector and ceasing to deliver fuel to the third fuel injector;

v. resetting the completion timer;

w. determining that the completion timer has expired;

x. turning off the spark exciter;

y. resetting the relight timer;

z. determining that the turbine exhaust temperature error is less than an allowable error; and aa. resetting the relight timer and continuing operation with the first injector.

14. A method of relighting a turbogenerator having an annular combustor with three equally spaced tangential fuel injectors, the method comprising:

a. determining that the combustor is operating on a single fuel injector considered the primary injector and that the primary injector is the third fuel injector which does not deliver fuel to the spark exciter area of the combustor;

b. determining that the turbine exhaust temperature error is greater than an allowable error;

c. determining that the turbine exhaust temperature delta is less than an allowable delta;

d. determining that the relight timer has expired;

e. turning on the spark exciter;

f. turning on the first fuel injector delivering fuel to the spark exciter area of the combustor;

g. turning on the third fuel injector and delivering fuel to the third fuel injector;

h. determining that the turbine exhaust temperature error is less than an allowable error;

i. switching the primary fuel injector from the third fuel injector to the first fuel injector and ceasing to deliver fuel to the third fuel injector;

j. resetting the completion timer;

k. determining that the completion timer has expired;

l. turning off the spark exciter;

m. resetting the relight timer;

n. determining that the turbine exhaust temperature error is less than an allowable error; and o. resetting the relight timer and continuing operation with the first injector.

15. A method of relighting a turbogenerator having an annular combustor with three equally spaced tangential fuel injectors, the method comprising:

a. determining that the combustor is operating on a single fuel injector considered the primary injector and that the primary injector is the third fuel injector which does not deliver fuel to the spark exciter area of the combustor;

b. determining that the turbine exhaust temperature error is greater than an allowable error;

c. determining that the turbine exhaust temperature delta is less than an allowable delta;

d. determining that the relight timer has expired;

e. turning on the spark exciter;

f. turning on the first fuel injector delivering fuel to the spark exciter area of the combustor;

g. turning on the third fuel injector and delivering fuel to the third fuel injector;

h. determining that the turbine exhaust temperature error is less than an allowable error;

i. switching the primary fuel injector from the third fuel injector to the first fuel injector and ceasing to deliver fuel to the third fuel injector;

j. resetting the completion timer;
k. determining that the completion timer has expired;
l. turning off the spark exciter;
m. resetting the relight timer;
n. determining that the turbine exhaust temperature error is more than an allowable error;
o. determining that the relight timer has expired;
p. turning on the spark exciter;
q. turning on the first fuel injector delivering fuel to the spark exciter area of the combustor;
r. determining that the turbine exhaust temperature error is less than an allowable error;
s. switching the primary fuel injector from the first fuel injector to the second fuel injector and delivering fuel to the second fuel injector;
t. resetting the completion timer;
u. determining that the completion timer has expired;
v. turning off the spark exciter;
w. turning off the first fuel injector;
x. resetting the relight timer;
y. determining that the turbine exhaust temperature error is less than an allowable error; and
z. resetting the relight timer and continuing operation with the second injector.

16. A method of maintaining combustion in a turbogenerator, the method comprising:
   providing a brake resistor across the DC bus of the power controller for the turbogenerator; and
   during idle or no load operating conditions, dissipating energy in the brake resistor to provide a minimum load for the turbogenerator.

17. The method of claim 16, wherein said turbogenerator includes a combustor having a plurality of fuel injectors and said method includes the additional steps of:
   a. determining that the combustor is operating on a single injector considered the primary injector;
   b. determining that combustion has ceased;
   c. determining that the relight timer has expired;
   d. turning on the spark exciter;
   e. turning on the fuel injector delivering fuel to the spark exciter area of the combustor;
   f. turning on fuel delivery to the then primary fuel injector if the then primary injector is not the injector delivering fuel to the spark exciter area of the combustor;
   g. determining that the combustor has been relit;
   h. switching the primary injector to the next sequential injector:
   i. turning off the spark exciter;
   j. turning off the fuel injector delivering fuel to the spark exciter area of the combustor if that injector is not the new primary injector;
   k. resetting the relight timer;
   l. determining that relight has occurred; and
   m. resetting the relight timer and continuing operation with the new primary injector.

18. The method of claim 16, wherein said turbogenerator includes a combustor having a plurality of fuel injectors and said method includes the additional steps of:
   a. determining that the combustor is operating on a single injector considered the primary injector;
   b. determining that combustion has ceased;
   c. turning on the ignitor;
   d. determining that the combustor has been relit;
   e. switching the primary injector to the next sequential injector:
   f. turning off the spark exciter; and
   g. continuing operation with the new primary injector.

19. A method of maintaining combustion in a turbogenerator, the method comprising:
   providing a brake resistor across the DC bus of the power controller for the turbogenerator; and
   during an off load event, dissipating energy in the brake resistor to lessen the rate of reducing fuel flow to the combustor.

20. The method of claim 19, wherein said turbogenerator includes a combustor having a plurality of fuel injectors and said method includes the additional steps of:
   a. determining that the combustor is operating on a single injector considered the primary injector;
   b. determining that combustion has ceased;
   c. turning on the ignitor;
   d. determining that the combustor has been relit;
   e. switching the primary injector to the next sequential injector:
   f. turning off the spark exciter; and
   g. continuing operation with the new primary injector.

21. The method of claim 19, wherein said turbogenerator includes a combustor having a plurality of fuel injectors and said method includes the additional steps of:
   a. determining that the combustor is operating on a single injector considered the primary injector;
   b. determining that combustion has ceased;
   c. determining that the relight timer has expired;
   d. turning on the spark exciter;
   e. turning on the fuel injector delivering fuel to the spark exciter area of the combustor;
   f. turning on fuel delivery to the then primary fuel injector if the then primary injector is not the injector delivering fuel to the spark exciter area of the combustor;
   g. determining that the combustor has been relit;
   h. switching the primary injector to the next sequential injector:
   i. turning off the spark exciter;
   j. turning off the fuel injector delivering fuel to the spark exciter area of the combustor if that injector is not the new primary injector;
   k. resetting the relight timer;
   l. determining that relight has occurred; and
   m. resetting the relight timer and continuing operation with the new primary injector.

22. A method of maintaining combustion in a turbogenerator, the method comprising:
   providing a brake resistor across the DC bus of the power controller for the turbogenerator;
   during idle or no load operating conditions, dissipating energy in the brake resistor to provide a minimum load for the turbogenerator; and
   during an off load event, dissipating energy in the brake resistor to lessen the rate of reducing fuel flow to the combustor.

23. The method of claim 22, wherein said turbogenerator includes a combustor having a plurality of fuel injectors and said method includes the additional steps of:

a. determining that the combustor is operating on a single injector considered the primary injector;

b. determining that combustion has ceased;

c. turning on the ignitor;

d. determining that the combustor has been relit;

e. switching the primary injector to the next sequential injector:

f. turning off the spark exciter; and g. continuing operation with the new primary injector.

24. The method of claim 22, wherein said turbogenerator includes a combustor having a plurality of fuel injectors and said method includes the additional steps of:

a. determining that the combustor is operating on a single injector considered the primary injector;

b. determining that combustion has ceased;

c. determining that the relight timer has expired;

d. turning on the spark exciter;

e. turning on the fuel injector delivering fuel to the spark exciter area of the combustor;

f. turning on fuel delivery to the then primary fuel injector if the then primary injector is not the injector delivering fuel to the spark exciter area of the combustor;

g. determining that the combustor has been relit;

h. switching the primary injector to the next sequential injector:

i. turning off the spark exciter;

j. turning off the fuel injector delivering fuel to the spark exciter area of the combustor if that injector is not the new primary injector;

k. resetting the relight timer;

l. determining that relight has occurred; and m. resetting the relight timer and continuing operation with the new primary injector.

25. A system for relighting a multi injector combustor in a turbogenerator, the system comprising:

a. means for determining that the combustor is operating on a single injector considered the primary injector;

b. means for determining that combustion has ceased;

c. means for turning on the ignitor;

d. means for determining that the combustor has been relit;

e. means for switching the primary injector to the next sequential injector:

f. means for turning off the spark exciter; and g. means for continuing operation with the new primary injector.

26. A system for relighting a multi injector combustor in a turbogenerator, the system comprising:

a. means for determining that the combustor is operating on a single injector considered the primary injector;

b. means for determining that combustion has ceased;

c. means for turning on the ignitor;

d. means for determining that the combustor has been relit;

e. means for switching the primary injector to the next sequential injector:

f. means for turning off the spark exciter;

g. means for determining that relight has occurred; and h. means for continuing operation with the new primary injector.

27. A system for relighting a multi injector combustor in a turbogenerator, the system comprising:

a. means for determining that the combustor is operating on a single injector considered the primary injector;

b. means for determining that combustion has ceased;

c. means for turning on the ignitor;

d. means for determining that the combustor has been relit;

e. means for switching the primary injector to the next sequential injector:

f. means for turning off the spark exciter;

g. means for determining that relight has not occurred;

h. means for repeating steps (a) through (f) until it is determined that relight has occurred with a stable primary injector; and i. means for continuing operation with the new primary injector.

28. A system for relighting a multi injector combustor in a turbogenerator, the system comprising:

a. means for determining that the combustor is operating on a single injector considered the primary injector;

b. means for determining that combustion has ceased;

c. means for determining that the relight timer has expired;

d. means for turning on the spark exciter;

e. means for turning on the fuel injector delivering fuel to the spark exciter area of the combustor;

f. means for turning on fuel delivery to the then primary fuel injector if the then primary injector is not the injector delivering fuel to the spark exciter area of the combustor;

g. means for determining that the combustor has been relit;

h. means for switching the primary injector to the next sequential injector:

i. means for turning off the spark exciter;

j. means for turning off the fuel injector delivering fuel to the spark exciter area of the combustor if that injector is not the new primary injector;

k. means for resetting the relight timer;

l. means for determining that relight has occurred; and m. means for resetting the relight timer and continuing operation with the new primary injector.

29. A system for relighting a multi injector combustor in a turbogenerator, the system comprising:

a. means for determining that the combustor is operating on a single injector considered the primary injector;

b. means for determining that combustion has ceased;

c. means for determining that the relight timer has expired;

d. means for turning on the spark exciter;

e. means for turning on the fuel injector delivering fuel to the spark exciter area of the combustor;

f. means for turning on fuel delivery to the then primary fuel injector if the then primary injector is not the injector delivering fuel to the spark exciter area of the combustor;

g. means for determining that the combustor has been relit;

h. means for switching the primary injector to the next sequential injector:

i. means for turning off the spark exciter;

j. means for turning off the fuel injector delivering fuel to the spark exciter area of the combustor if that injector is not the new primary injector;

k. means for resetting the relight timer;

l. means for determining that relight has not occurred;

m. means for resetting the relight timer;

n. means for repeating steps (a) through (k) until it is determined that relight has occurred with a stable primary injector; and o. means for resetting the relight timer and continuing operation with the new primary injector.

30. A system for relighting a turbogenerator having an annular combustor with three equally spaced tangential fuel injectors, the system comprising:

a. means for determining that the combustor is operating on a single fuel injector considered the primary injector;

b. means for determining that combustion has ceased;

c. means for turning on the ignitor;

d. means for determining that the combustor has been relit;

e. means for switching the primary injector from the primary fuel injector to the next sequential fuel injector;

f. means for turning off the spark ignitor;

g. means for determining that relight has occurred; and h. means for continuing operation with the new primary injector.

31. A system for maintaining combustion in a turbogenerator, the system comprising:

a brake resistor disposed across the DC bus of the power controller for the turbogenerator; and means for dissipating energy in said brake resistor during idle or no load operating conditions to provide a minimum load for the turbogenerator.

32. The system of claim 31, wherein said turbogenerator includes a combustor having a plurality of fuel injectors and said system additionally includes:

a. means for determining that the combustor is operating on a single injector considered the primary injector;

b. means for determining that combustion has ceased;

c. means for turning on the ignitor;

d. means for determining that the combustor has been relit;

e. means for switching the primary injector to the next sequential injector:

f. means for turning off the spark exciter; and g. means for continuing operation with the new primary injector.

33. A system of maintaining combustion in a turbogenerator, the system comprising:

a brake resistor disposed across the DC bus of the power controller for the turbogenerator; and means for dissipating energy in said brake resistor during an off load event to lessen the rate of reducing fuel flow to the combustor.

34. The system of claim 33, wherein said turbogenerator includes a combustor having a plurality of fuel injectors and said system additionally includes:

a. means for determining that the combustor is operating on a single injector considered the primary injector;

b. means for determining that combustion has ceased;

c. means for turning on the ignitor;

d. means for determining that the combustor has been relit;

e. means for switching the primary injector to the next sequential injector:

f. means for turning off the spark exciter; and g. means for continuing operation with the new primary injector.

35. A system of maintaining combustion in a turbogenerator, the system comprising:

a brake resistor disposed across the DC bus of the power controller for the turbogenerator;

means for dissipating energy in said brake resistor during idle or no load operating conditions to provide a minimum load for the turbogenerator; and means for dissipating energy in said brake resistor during an off load event to lessen the rate of reducing fuel flow to the combustor.

* * * * *